(12) United States Patent
Koizumi et al.

(10) Patent No.: US 10,640,342 B2
(45) Date of Patent: May 5, 2020

(54) BACK STOP FOR CRANE

(71) Applicant: KOBELCO CONSTRUCTION MACHINERY CO., LTD., Hiroshima-shi (JP)

(72) Inventors: Yukio Koizumi, Hyogo (JP); Yohei Matsuo, Hyogo (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 96 days.

(21) Appl. No.: 15/998,942

(22) PCT Filed: Jan. 26, 2017

(86) PCT No.: PCT/JP2017/002753
§ 371 (c)(1),
(2) Date: Aug. 17, 2018

(87) PCT Pub. No.: WO2017/150022
PCT Pub. Date: Sep. 8, 2017

(65) Prior Publication Data
US 2019/0225465 A1 Jul. 25, 2019

(30) Foreign Application Priority Data
Mar. 3, 2016 (JP) .................. 2016-041087

(51) Int. Cl.
*B66C 23/92* (2006.01)
*B66C 23/82* (2006.01)
(Continued)

(52) U.S. Cl.
CPC ............ *B66C 23/92* (2013.01); *B66C 23/823* (2013.01); *F16F 9/3278* (2013.01);
(Continued)

(58) Field of Classification Search
CPC ....... B66C 23/823; B66C 23/92; B66C 23/36; B66C 23/72; B66C 13/22;
(Continued)

(56) References Cited

U.S. PATENT DOCUMENTS 1,564,554 A * 12/1925 Gifford ................ B62B 3/0618
188/269
2,914,312 A * 11/1959 Cheesman .............. B66C 23/92
267/126

(Continued)

FOREIGN PATENT DOCUMENTS

JP 57-184887 U 11/1982
JP 60-12593 U 1/1985
(Continued)

OTHER PUBLICATIONS

Extended European Search Report dated Jan. 22, 2019 in Patent Application No. 17759494.2, 6 pages.
(Continued)

Primary Examiner — Robert A. Siconolfi
Assistant Examiner — San M Aung
(74) Attorney, Agent, or Firm — Oblon, McClelland, Maier & Neustadt, L.L.P.

(57) ABSTRACT

A back stop for a crane which eliminates operator's discomfort and adverse effects on surrounding environment due to generation of abnormal noise and enables greasing work to be facilitated. A back stop includes an outer casing having a base end portion turnably connected to a boom or a crane main body and an opening portion opened in the outer casing front end portion; an inner casing having a base end portion turnably connected to the crane main body or the boom and having a front end portion side slidably fitted into the outer case through the opening portion; and a greasing tube arranged in the outer casing or the inner casing. An inlet of
(Continued)

the greasing tube is arranged outside of the outer casing or outside of the inner casing on the base end portion side on which the greasing tube is arranged. A discharge port of the greasing tube is attached to a front end portion of the inner casing.

8 Claims, 8 Drawing Sheets

(51) Int. Cl.
*F16F 9/32* (2006.01)
*F16F 13/00* (2006.01)

(52) U.S. Cl.
CPC .... *F16F 13/007* (2013.01); *F16F 2224/0208* (2013.01); *F16F 2230/0047* (2013.01); *F16F 2230/06* (2013.01)

(58) Field of Classification Search
CPC .............. B66C 2700/0371; E02F 3/382; F16F 9/3278; F16F 9/061; F16F 9/065; F16F 9/067; F16F 9/366; F16F 13/007; F16F 2224/0208; F16F 2230/06; F16F 2230/0047; F16F 2230/24
USPC ........ 188/266, 269, 314, 281, 375; 267/126; 212/293, 298, 180
See application file for complete search history.

(56) References Cited

U.S. PATENT DOCUMENTS

| | | | |
|---|---|---|---|
| 3,187,906 A * | 6/1965 | Bushong | B66C 23/92 212/298 |
| 4,270,663 A | 6/1981 | Berger | |
| 8,246,019 B2 * | 8/2012 | Krajenke | E05C 17/30 188/270 |
| 2010/0294736 A1 * | 11/2010 | Wernecke | B66C 23/92 212/293 |
| 2013/0220749 A1 | 8/2013 | Stammen | |

FOREIGN PATENT DOCUMENTS

| | | |
|---|---|---|
| JP | 60-122793 U | 8/1985 |
| JP | 60-173593 U | 11/1985 |
| JP | 61-56391 U | 4/1986 |
| JP | 2001-158594 A | 6/2001 |
| JP | 2002-47681 A | 2/2002 |
| JP | 2004-315160 A | 11/2004 |
| JP | 2011-84349 A | 4/2011 |
| JP | 2012-232822 A | 11/2012 |

OTHER PUBLICATIONS

International Search Report dated Apr. 25, 2017 in PCT/JP2017/002753 filed Jan. 26, 2017.

* cited by examiner

BACK STOP FOR CRANE

TECHNICAL FIELD

The present invention relates to a back stop for a crane to be mounted on a crane.

BACKGROUND ART

Generally, a crane is equipped with a back stop for restricting an up-down angle of a boom attached to a main body of the crane so as to be capable of going up and down. As recited, for example, in Patent Literature 1, the back stop includes an outer casing having an opening portion with a front end thereof opened, and an inner casing having a front end side slidably fitted into the outer casing from the opening portion. One of a base end portion of the outer casing and a base end portion of the inner casing is turnably connected to a crane main body and the other base end portion is turnably connected to a boom.

CITATION LIST

Patent Literature

Patent Literature 1: Unexamined Japanese Utility Model Publication No. 60-12593

SUMMARY OF INVENTION

With such a back stop, however, when a front end side of an inner casing slides in an outer casing to conduct extension and contraction, abnormal noise may be generated at a point at which the front end portion of the inner casing and an inner circumference surface of the outer casing come into contact with each other, and at a point at which a proximity of an opening portion of a front end portion of the outer casing and an outer circumference surface of the inner casing come into contact with each other. Therefore, greasing ports have been conventionally provided at two points of the outer casing at which the front end portion of the inner casing is located when the boom is in a generally horizontal state and when the boom is in a generally raised state, thereby supplying grease through the greasing ports, i.e., conducting greasing.

However, with conventional greasing methods, pin-point greasing at a contact point in order to eliminate abnormal noise cannot be conducted with ease because the contact point is within an outer casing. Therefore, in particular, when greasing a point where a front end portion of an inner casing and an inner circumference surface of an outer casing come into contact with each other, a lot of labor and time are required for worker's necessary work of once extracting a back stop from a crane main body or the like, and then pulling out the inner casing from the outer casing and applying grease to the front end portion of the inner casing.

The present invention has been made in view of such circumstances, and an object thereof is to provide a back stop for a crane which, in particular, when abnormal noise is generated at a point at which a front end portion of an inner casing and an inner circumference surface of an outer casing come into contact with each other, eliminates operator's discomfort and adverse effects on surrounding environment due to generation of abnormal noise by pin-point greasing of the contact point, and enables greasing work to be facilitated.

In order to solve the above problem, a crane directed by the present invention includes: an up-down body attached to a crane main body so as to be capable of going up and down; and a back stop having one end turnably connected to the up-down body and the other end turnably connected to the crane main body to prevent the up-down body from falling down. The back stop for a crane of the present invention has the following configuration. Specifically, the back stop has an outer casing, an inner casing, and an inner greasing tube. The outer casing has an outer casing base end portion turnably connected to one of the up-down body and the crane main body, and an outer casing front end portion arranged on a side opposite to the outer casing base end portion, and is formed with an opening portion opened in the outer casing front end portion. The inner casing has an inner casing base end portion turnably connected to the other of the crane main body and the up-down body, and an inner front end portion arranged on a side opposite to the inner casing base end portion and to be inserted into the outer casing from the opening portion, and is slidably fitted in the outer casing. The inner greasing tube includes: an injection portion which is arranged, on a base end portion side out of an outer casing base end portion side or an inner casing base end portion side of the one casing, outside of the one casing, and is formed with an inlet opened for accepting grease; a guide portion connected to the injection portion and disposed in the one casing; and a discharge portion connected to the guide portion and attached to the inner casing front end portion, and is formed with a discharge port opened to allow the grease having passed through the guide portion to be discharged into the outer casing.

Since the back stop for a crane according to the present invention suppresses generation of abnormal noise in a front end portion of an inner casing, operator's discomfort and adverse effects on surrounding environment can be eliminated, while enabling greasing work to be conducted easily and quickly.

DESCRIPTION OF EMBODIMENTS

In the following, an embodiment as a mode for implementing the present invention will be described with reference to the drawings.

Figure 1:
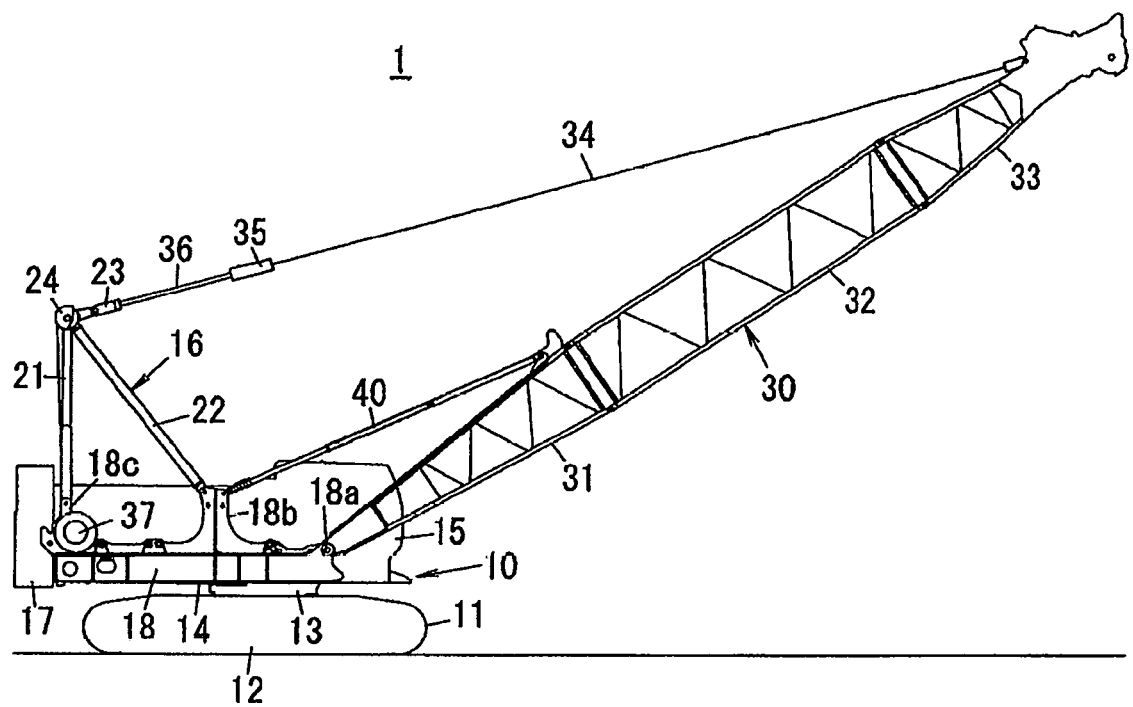
FIG. 1 is a side view showing an overall configuration of a crawler crane according to one embodiment of the present invention.

FIG. 1 shows an overall configuration of a crawler crane 1 (crane) according to one embodiment of the present invention. The crawler crane 1 includes a crane main body 10, a boom 30 (up-down body) attached to the crane main body 10 so as to be capable of going up and down, and a back stop 40 (back stop for a crane) which restricts an up-down angle of the boom 30 to prevent the boom 30 from falling down.

The crane main body 10 has a lower travelling body 12 caused to travel by a crawler 11, an upper slewing body 14 set up on the lower travelling body 12 so as be capable of slewing via a slewing device 13, a cab 15 provided in a front portion of the upper slewing body 14, and a gantry 16 and a counter weight 17 provided in a rear portion of the upper slewing body 14.

The upper slewing body 14 has a slewing frame 18 as a strengthening member. A boom foot portion 18a is provided in a front end portion of the slewing frame 18, and an intermediate attachment portion 18b is provided in a central portion of the slewing frame 18. Additionally, a rear end attachment portion 18c is provided in a rear end portion of the slewing frame 18.

The gantry 16 has a tension member 21 and a compression member 22, with front ends of the tension member 21 and the compression member 22 being connected with each other. A base end of the tension member 21 is connected to the rear end attachment portion 18c of the slewing frame 18, and a base end of the compression member 22 is connected to the intermediate attachment portion 18b of the slewing frame 18. A lower spreader 23 and a sheave 24 are attached to a top portion of the gantry 16 (i.e., a connection portion between the tension member 21 and the compression member 2).

The boom 30 is configured by a lower boom 31, an intermediate boom 32, and an upper boom 33, which are coupled sequentially. A base end portion of the boom 30 (i.e., an end portion on the lower boom 31 side) is attached to the boom foot portion 18a so as to be turnable, i.e., so as to be capable of going up and down. One end of a guyline 34 is coupled to a front end portion of the boom 30 (i.e., an end portion on the upper boom 33 side), and on the other end of the guyline 34, an upper spreader 35 is provided.

A boom up-down rope 36 is wound around between the upper spreader 35 and the lower spreader 23, with one end portion of the boom up-down rope 36 being wound up by a boom up-down winch 37 disposed in the rear end portion of the slewing frame 18 through the sheave 24 in the top portion of the gantry 16. The boom 30 is designed to conduct up-down operation as a result of repetitive winding-up or feeding of the boom up-down rope 36 by the boom up-down winch 37. Although not shown, a hanging hook is hung from a front end of the boom 30 via a winding-up rope, and hanging work is conducted using the hanging hook or the like.

The back stop 40 is arranged to extend between the intermediate attachment portion 18b of the slewing frame 18 of the crane main body 10 and an end portion of the lower boom 31, on the intermediate boom 32 side, in the boom 30. Specifically, one end of the back stop 40 is turnably connected to the end portion of the lower boom 31, on the intermediate boom 32 side, in the boom 30, and other end of the back stop 40 is turnably connected to the intermediate attachment portion 18b of the slewing frame 18 in the crane main body 10. In the following, a structure of the back stop 40 will be further described with reference to FIG. 2 to FIG. 8.

Figure 2:
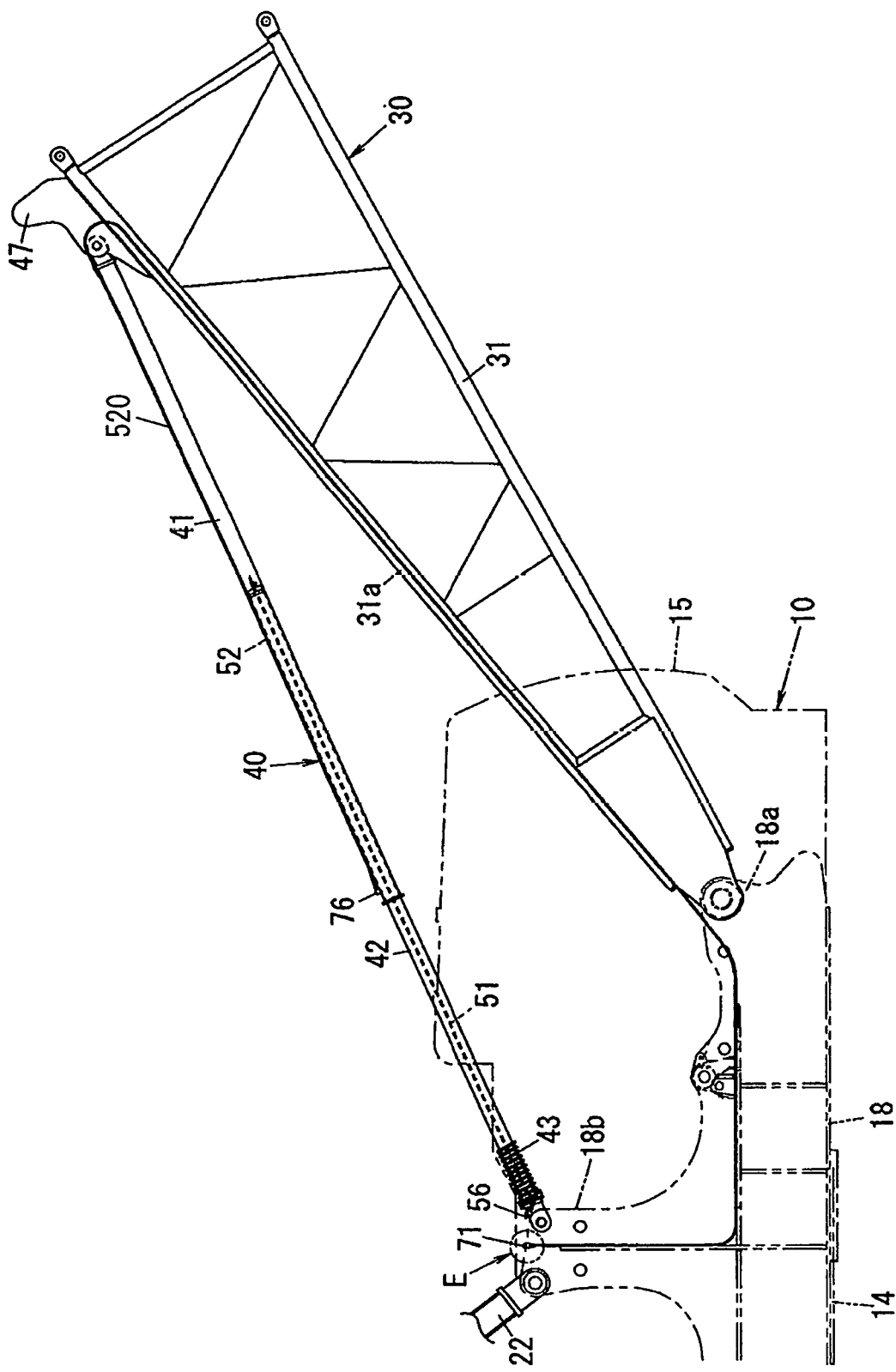
FIG. 2 is a side view showing an attachment state of a back stop of the crawler crane.
Figure 3:
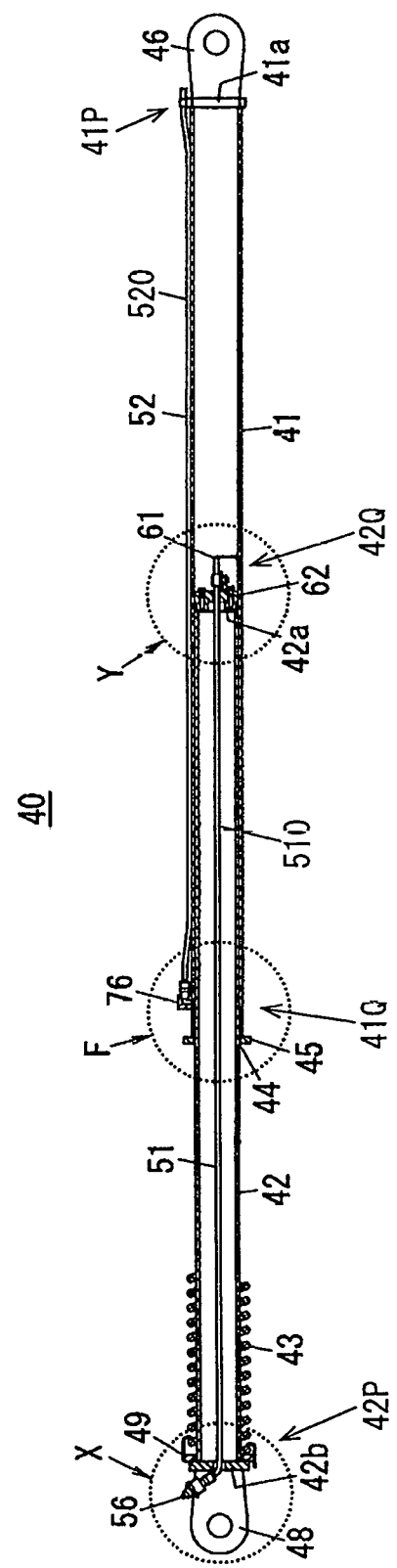
FIG. 3 is a longitudinal sectional side view of the back stop.

Specifically, as shown in FIG. 2 and FIG. 3, the back stop 40 has an outer casing 41, an inner casing 42 slidably fitted in the outer casing 41, and a cushioning coil spring 43 attached to an outer circumference of one end portion of the inner casing 42. The outer casing 41, the inner casing 42, and the coil spring 43, which are all made of iron or steel metal in the present embodiment, may be made of other metal, alloy, or the like.

The outer casing 41 is a tubular member being formed with an opening portion 44 with a front end opened (see FIG. 6), and a ring-shaped flange member 45 is fitted to an outer circumference of a front end portion of the outer casing 41 (an outer casing front end portion 41Q of FIG. 3). A base end portion of the outer casing 41 (an outer casing base end portion 41P of FIG. 3) arranged on a side opposite to the above front end portion is covered by an end plate 41a, to which a connection plate 46 having a pin hole is fixed. The connection plate 46 is turnably connected to a bracket 47 which is attached to an end portion of a back side main beam 31a, on the intermediate boom 32 side, of the lower boom 31 of the boom 30 by a connection pin inserted into a pin hole. Accordingly, the base end portion of the outer casing 41 is turnably connected to the boom 30 around the connection pin via the connection plate 46 and the bracket 47.

The inner casing 42 is a tubular member with an outer diameter slightly smaller than an inner diameter of the outer casing 41, and both ends of the inner casing 42 are blocked by end plates 42a and 42b, respectively. A front end portion side of the inner casing 42 (an inner casing front end portion 42Q of FIG. 3) is inserted into the outer casing 41 from the opening portion 44 of the outer casing 41 and is slidably fitted therein. The end plate 42b is fixed to an end edge of a base end portion of the inner casing 42 (an inner casing base end portion 42P of FIG. 3) which is arranged on a side opposite to the above front end portion. A connection plate 48 having a pin hole is fixed to the end plate 42b. The connection plate 48 is turnably connected to an upper end portion of the intermediate attachment portion 18b of the slewing frame 18 by a connection pin inserted into the pin hole. Accordingly, the base end portion of the inner casing 42 is connected to the crane main body 10 so as to be turnable around the connection pin via the connection plate 48.

Figure 4:
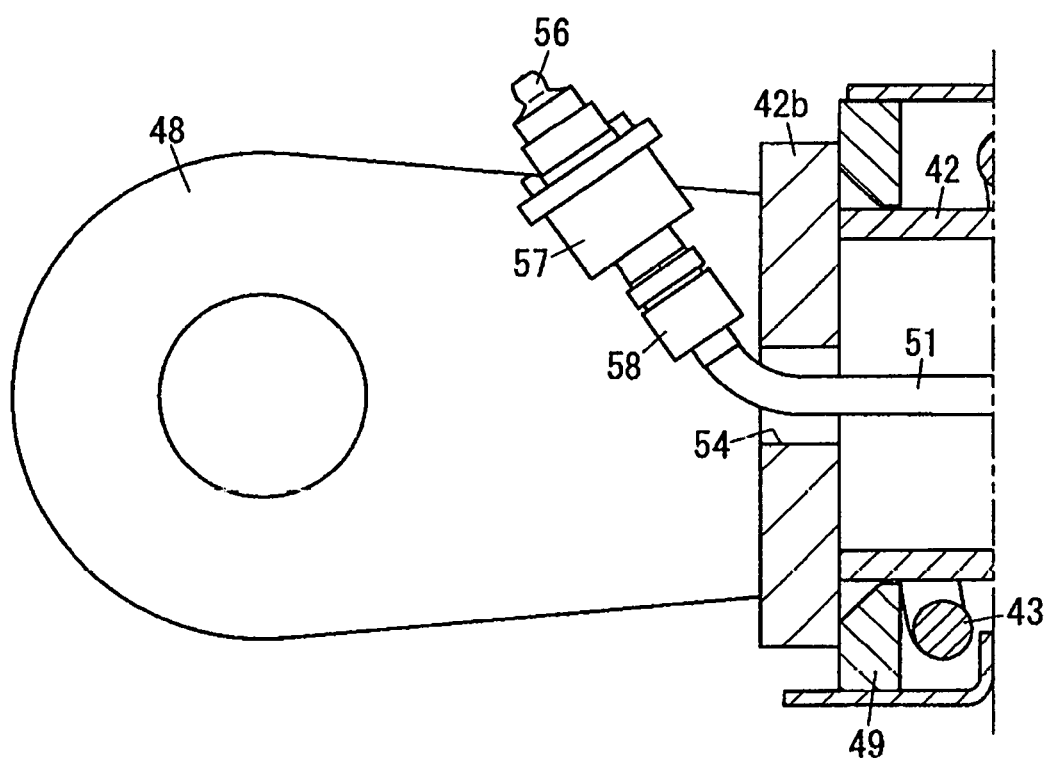
FIG. 4 is an enlarged view of a vicinity of X in FIG. 3.

One end side of the coil spring 43 externally fitted to the base end portion of the inner casing 42 is held by a spring seat 49 fixed to the end plate 42b on the base end portion side of the inner casing 42, as specifically shown in FIG. 4 as expansion. Then, when the boom 30 is raised by more than a set angle (approximately 80°), the flange member 45 of the front end portion of the outer casing 41 moving to the base end portion side of the inner casing 42 hits the other end side of the coil spring 43, so that the coil spring 43 is compressively deformed to prevent the boom 30 from falling down backward.

The back stop 40 further has a first greasing tube 51 (inner greasing tube) arranged inside the inner casing 42, and a second greasing tube 52 (outer greasing tube) arranged along an entire length of an outer circumference surface of the outer casing 41. Although both the greasing tubes 51 and 52 are made of rubber or synthetic resin having flexibility in the present embodiment, a metal pipe may be used to form a whole or a part of the tube.

Figure 5:
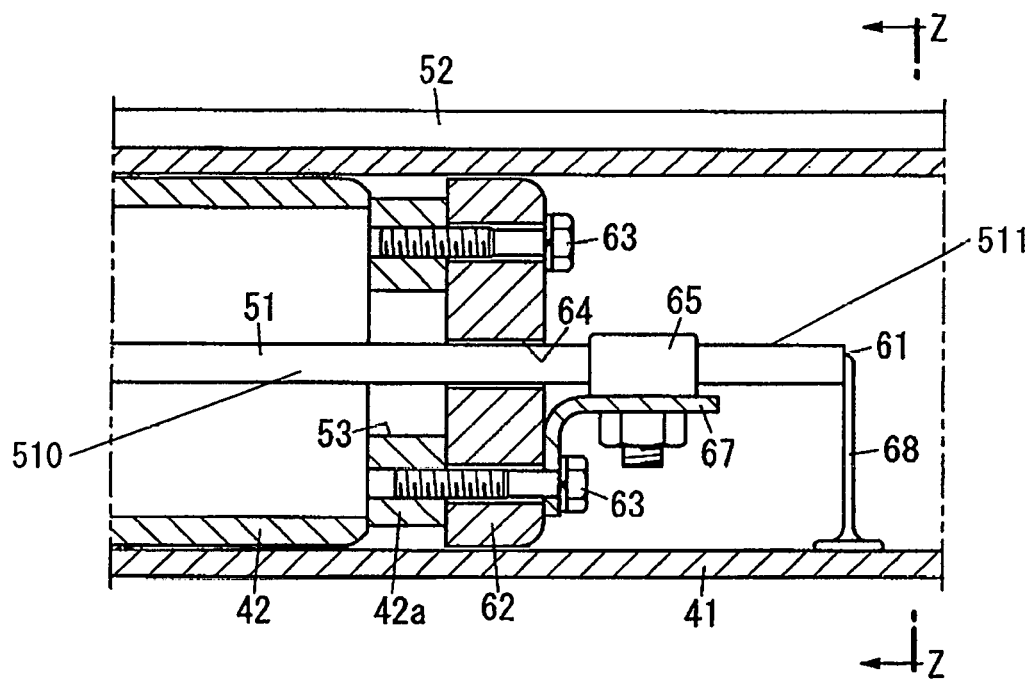
FIG. 5 is an enlarged view of a vicinity of Y in FIG. 3.

The first greasing tube 51 has a function of greasing a slide portion between an outer circumference surface of the front end portion of the inner casing 42 and an inner circumference surface of the outer casing 41. The first greasing tube 51 is linearly arranged inside the inner casing 42 over the entire length of the inner casing 42. When arranging the first greasing tube 51 in the inner casing 42, the end plates 42a and 42b blocking both end portions of the inner casing 42 are respectively provided with through holes 53 and 54 each having an inner diameter larger than an outer diameter of the first greasing tube 51 as shown in FIG. 4 or FIG. 5, and the first greasing tube 51 is arranged inside the inner casing 42 through the through holes 53 and 54. In other words, the through hole 54 (FIG. 4) allows a guide portion 510 to be inserted therein such that an inlet 56 is arranged outside the inner casing 42.

The first greasing tube 51 has a greasing block 57 (injection portion) with the inlet 56 opened, the guide portion 510, and a discharge portion 511 including a discharge port 61. Specifically, one end of the first greasing tube 51 is drawn to the outside of the inner casing 42 through the through hole 54 of the end plate 42b on the base end portion side of the inner casing 42, and is connected to the greasing block 57 having the inlet 56 via a connector 58 as shown in FIG. 4. Accordingly, the injection portion 57 including the inlet 56 of the first greasing tube 51 is externally drawn (arranged) to the outside of the inner casing 42 on the base end portion side of the inner casing 42. The inlet 56 of the greasing block 57 is configured to open a path to accept injection of grease when a grease gun is connected and to close the path when the grease gun is extracted, as conventionally known. The guide portion 510 is connected to the greasing block 57 and is disposed in the inner casing 42. The guide portion 510 may be disposed along an inner circumference surface of the inner casing 42 or may be disposed so as to be curved in the inner casing 42.

Figure 6:
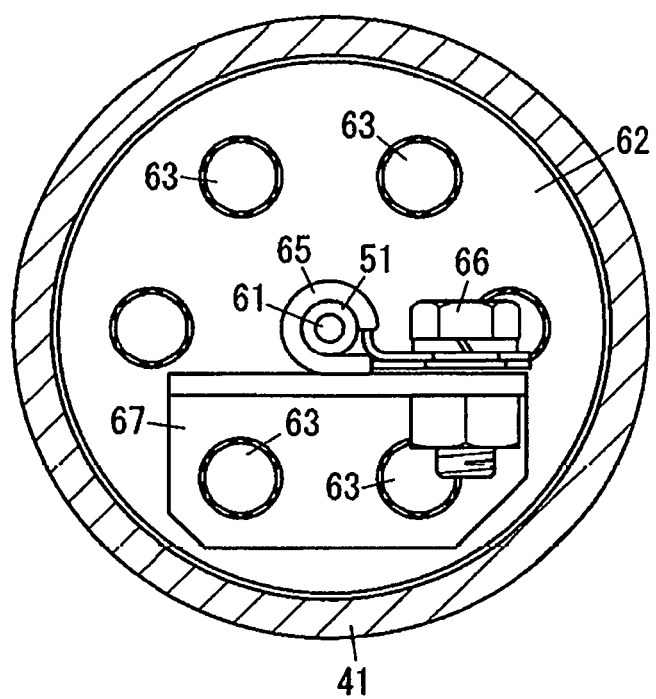
FIG. 6 is a sectional view taken along line Z-Z in FIG. 5.

The discharge portion 511 on the other side of the first greasing tube 51 is connected to the guide portion 510 and is also attached to the front end portion of the inner casing 42. The discharge port 61 opened in the discharge portion 511 allows grease passing through the guide portion 510 to be discharged into the outer casing 41. An outer diameter of the end plate 42a on the front end portion side of the inner casing 42 is set to be smaller than an outer diameter of a main body portion of the inner casing 42 as shown in FIG. 5. Further, the inner casing 42 includes a disk-shaped pad 62 (contact member) forming a part of the front end portion of the inner casing 42. As shown in FIG. 6, the pad 62 is attached to an outer face of the end plate 42a by a plurality (6 in FIG. 6) of bolts 63 so as to make contact with the inner circumference surface of the outer casing 41 in place of the end plate 42a. The pad 62 is made of nylon resin, and the nylon resin as a material of the pad 62 has a coefficient of friction smaller than a coefficient of friction of iron or steel as a material of the inner casing 42. A coefficient of static friction between nylon resins is approximately 0.15 to 0.25, and a coefficient of static friction between irons is approximately 0.52.

A through hole 64 penetrating the pad 62 is provided in a central portion of the pad 62 such that the guide portion 510 in the vicinity of the discharge port 61 of the first greasing tube 51 is inserted. The discharge port 61 of the first greasing tube 51 is fixed to the pad 62 via a clamp 65, a clamp attaching bolt 66, an attachment member 67, and the like in a state of protruding from the through hole 64 of the pad 62 to the outside of the inner casing 42 by a predetermined length (approximately 20 to 30 mm). The clamp 65 is attached to the attachment member 67 by the clamp attaching bolt 66 while holding the first greasing tube 51, and the attachment member 67 is fixed to the pad 62 by two bolts located below the first greasing tube 51 among the plurality of bolts 63 for attaching the pad 62 to the end plate 42a. As a result, the discharge portion 511 of the first greasing tube 51 is located closer to the front end portion side of the inner casing 42 than the pad 62 is. In FIG. 5, 68 denotes grease to be discharged from the discharge port 61 of the first greasing tube 51.

Figure 7:
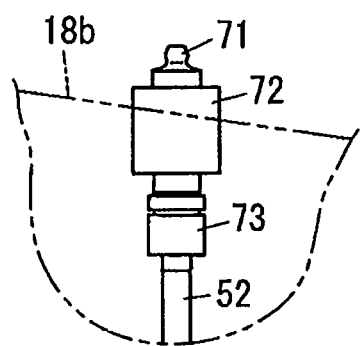
FIG. 7 is an enlarged view of a vicinity of E in FIG. 2.

On the other hand, the second greasing tube 52 is arranged along the outer circumference portion of the outer casing 41 and has a function of greasing a slide portion between an inner circumference surface of the front end portion of the outer casing 41 and the outer circumference surface of the inner casing 42. The second greasing tube 52 has an inlet 71 (FIG. 2), a guide portion 520, a greasing block 76 (outer discharge portion), and a connector 77. One end side of the second greasing tube 52 is arranged from the base end portion side of the outer casing 41 along the back side main beam 31a of the lower boom 31 of the boom 30, and further up to an upper end of the intermediate attachment portion 18b via the boom foot portion 18a of the slewing frame 18 as shown in FIG. 2. The one end of the second greasing tube 52 is connected to a greasing block 72 having the inlet 71 via a connector 73 as shown in FIG. 7. Accordingly, the inlet 71 of the second greasing tube 52 is disposed at a position closer to the inlet 56 of the first greasing tube 51. Similarly to the inlet 56 of the greasing block 57, the inlet 71 of the greasing block 72 is configured to open a path to accept injection of grease when the grease gun is connected and to close the path when the grease gun is extracted.

Figure 8:
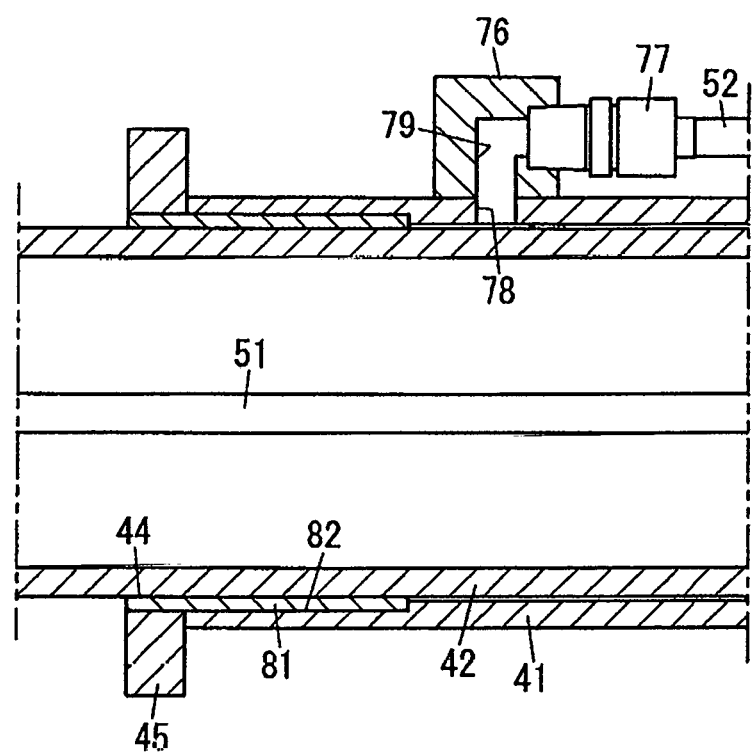
FIG. 8 is an enlarged view of a vicinity of F in FIG. 3.

The other end of the second greasing tube 52 is connected to the greasing block 76 provided near the opening portion 44 in the front end portion of the outer casing 41 via the connector 77, as specifically shown in FIG. 8 as expansion. Additionally, a greasing port 78 is opened in the front end portion of the outer casing 41, the greasing port penetrating the outer casing 41 so as to communicate the outer circumference surface of the outer casing 41 with the inner circumference surface of the outer casing 41 (FIG. 8). The greasing block 76 has a path 79 which communicates (connects) with the greasing port 78 provided in the outer casing 41. Accordingly, the greasing block 76 is a member constituting a discharge portion of the second greasing tube 52, and is connected to a gap between the inner circumference surface of the outer casing 41 and the outer circumference surface of the inner casing 42 through the greasing port 78 provided in the outer casing 41 near the opening portion 44 of the front end portion of the outer casing 41. As a result, the second greasing tube 52 communicates with the gap between the inner circumference surface of the outer casing 41 and the outer circumference surface of the inner casing 42.

The outer casing 41 further includes a tubular bush 81 (FIG. 8). The bush 81 is fitted in and fixed to the inner circumference surface of the outer casing 41 near the opening portion 44 of the front end portion of the outer casing. The bush 81 has an inner circumference surface (slide inner circumference surface) which slides with the outer circumference surface of the inner casing 42. When fitting in the bush 81, an expanded inner diameter portion 82 is axially formed near the opening portion 44 of the front end portion of the outer casing 41 over a predetermined length from the opening portion 44, the expanded inner diameter portion being obtained by cutting the inner circumference surface of the outer casing 41 so as to have an inner diameter larger than an inner diameter of other part of the outer casing 41. The bush 81 is fitted in and fixed to the expanded inner diameter portion 82. The bush 81 has an inner diameter set to be equal to or slightly smaller than an inner diameter of a part other than the expanded inner diameter portion 82 of the outer casing 41. The bush 81 has a length set to be larger by a predetermined length than an axial length of the expanded inner diameter portion 82. As a result, when the bush 81 is fitted in and fixed to the expanded inner diameter portion 82, a part of the bush 81 protrudes to the outside of the outer casing 41 by a predetermined length. The above flange member 45 is fitted in and fixed to the part of the bush 81 protruding to the outside of the outer casing 41, and the part of the bush 81 protruding to the outside of the outer casing 41 substantially forms the opening portion 44 of the outer casing 41. Additionally, the bush 81 is formed by, for example, sintering a copper-tin alloy on an inner circumference surface of steel back metal and lining an upper face of the sintered material with a resin agent. A material of the bush 81 has a coefficient of friction smaller than a coefficient of friction of iron or steel as a material of the outer casing 41.

Next, as function and effects of the embodiment, when an operator conducts up-down operation of the boom 30 by the crawler crane 1, the front end portion side of the inner casing 42 slides in the outer casing 41 in the back stop 40. At this time, due to flexure of the back stop 40, in particular, the front end portion of the inner casing 42 and the inner circumference surface of the outer casing 41, and the proximity of the opening portion 44 in the front end portion of the outer casing 41 and the outer circumference surface of the inner casing 42 slide while making contact with each other, so that when grease runs short in these contact parts, abnormal noise is generated.

Among generation of such abnormal noises, when abnormal noise is generated in the contact part between the front end portion of the inner casing 42 and the inner circumference surface of the outer casing 41, an operator or a worker connects the grease gun to the inlet 56 of the first greasing tube 51 drawn out from the inner casing 42 of the back stop 40 to inject grease from the inlet 56 of the first greasing tube 51 at an arbitrary up-down angle of the boom 30 which requires greasing for eliminating the abnormal noise, i.e., at an up-down angle at the time of generation of abnormal noise. Then, grease 68 is discharged pin-point to the contact part between the front end portion of the inner casing 42 and the inner circumference surface of the outer casing 41 from the discharge port 61 of the first greasing tube 51 attached to the front end portion of the inner casing 42 through the first greasing tube 51 arranged in the inner casing 42 of the back stop 40. This enables suppression or elimination of abnormal noise generation in the front end portion of the inner casing 42 to eliminate operator's discomfort and adverse effects on surrounding environment, as well as enabling greasing work to be conducted easily and quickly.

In particular, in a case of the present embodiment, the base end portion of the outer casing 41 is turnably connected to the boom 30, and the base end portion of the inner casing 42 is turnably connected to the crane main body 10 (specifically, the intermediate attachment portion 18b of the slewing frame 18 of the upper slewing body 14). Additionally, the first greasing tube 51 is arranged in the inner casing 42 over the entire length of the inner casing 42, and the inlet 56 of the first greasing tube 51 is drawn to the outside of the inner casing 42 from the base end portion of the inner casing 42 through the through hole 54 of the end plate 42b. Therefore, it is possible to conduct greasing work at a low position on the crane main body 10 side safely and appropriately while reducing the length of the first greasing tube 51 as much as possible.

Additionally, the pad 62 contacting the inner circumference surface of the outer casing 41 is attached to the front end portion of the inner casing 42, and in the pad 62, the through hole 64 is provided through which the proximity of the discharge port 61 of the first greasing tube 51 penetrates. Therefore, while making contact with the inner circumference surface of the outer casing 41, the pad 62 attached to the front end portion of the inner casing 42 supplies the grease 68 to the contact part, the grease discharged from the discharge port 61 of the first greasing tube 51 which penetrates through the through hole 64 of the pad 62 to be attached to the pad 62, thereby reliably conducting greasing.

Further, since a coefficient of friction of nylon resin as a material of the pad 62 is smaller than a coefficient of friction of iron or steel as a material of the inner casing 42, a slide resistance between the pad 62 and the inner circumference surface of the outer casing 41 accordingly becomes smaller than a slide resistance between the front end portion of the inner casing 42 and the inner circumference surface of the outer casing 41, so that synergistic effects with greasing enables occurrence frequency of abnormal noise to be suppressed to be as low as possible. A coefficient of static friction of a contact part between the pad 62 made of nylon resin and the inner circumference surface of the outer casing 41 made of steel is approximately 0.2 without lubrication and is lowered to be approximately 0.1 when lubricated with grease.

On the other hand, when abnormal noise is generated in the contact part between the proximity of the opening portion 44 in the front end portion of the outer casing 41 and the outer circumference surface of the inner casing 42, an operator or a worker supplies grease through the second greasing tube 52 arranged along an entire length of an outer face of the outer casing 41 at an arbitrary up-down angle of the boom 30 which requires greasing for eliminating the abnormal noise. Then, the grease is discharged to the gap between the inner circumference surface of the outer casing 41 and the outer circumference surface of the inner casing 42 from the greasing block 76 as a discharge port of the second greasing tube 52 through the greasing port 78 provided in the outer casing 41 in proximity to the opening portion 44 of the front end portion of the outer casing 41. This enables suppression or elimination of abnormal noise generation in proximity to the opening portion 44 in the front end portion of the outer casing 41 to eliminate operator's discomfort and adverse effects on surrounding environment.

In particular, in a case of the present embodiment, one end side of the second greasing tube 52 is arranged from the base end portion side of the outer casing 41 along the back side main beam 31a of the lower boom 31 of the boom 30, and further up to the upper end of the intermediate attachment portion 18b via the boom foot portion 18a of the stewing frame 18. The inlet 71 of the second greasing tube 52 provided at one end of the second greasing tube 52 is disposed at a position near the inlet 56 of the first greasing tube 51. Accordingly, similarly to the case of conducting greasing by the first greasing tube 51, greasing work can be conducted at a low position on the crane main body 10 side safely and appropriately.

Also, the bush 81 is fitted in and fixed to the inner circumference surface in proximity to the opening portion 44 in the front end portion of the outer casing 41, and the coefficient of friction of the material of the bush 81 is smaller than the coefficient of friction of a material of the outer casing 41 (iron or steel). Therefore, a slide resistance between the bush 81 fitted in and fixed to the inner circumference surface in proximity to the opening portion 44 in the front end portion of the outer casing 41 and the outer circumference surface of the inner casing 42 becomes smaller than a slide resistance between the inner circumference surface in proximity to the opening portion 44 in the front end portion of the outer casing 41 and the outer circumference surface of the inner casing 42, so that synergistic effects with greasing enables occurrence frequency of abnormal noise to be suppressed to be as low as possible.

The present invention is not limited to the above embodiment and includes other various modes. For example, while in the above embodiment, the first greasing tube 51 is arranged in the inner casing 42 of the back stop 40, the present invention is not limited thereto, and can be configured such that the greasing tube is arranged in the outer casing 41 of the back stop 40, with an inlet of the greasing tube being drawn out from the base end portion side of the outer casing 41 to the outside of the outer casing 41 and a discharge port of the greasing tube being attached to the front end portion of the inner casing 42. In this case, the greasing tube arranged in the outer casing 41 should be formed in a coil shape so as to be extensible such that when the back stop 40 extends or contracts, the greasing tube does not interfere with extension and contraction of the back stop 40. Additionally, when the base end portion of the outer casing 41 is connected to the boom 30, it is preferable that one end side of the greasing tube drawn to the outside of the outer casing 41 from the base end portion side of the outer casing 41 is arranged along the back side main beam 31*a* of the lower boom 31 of the boom 30, and further up to the upper end of the intermediate attachment portion 18*b* via the boom foot portion 18*a* of the slewing frame 18, with the inlet of the greasing tube being disposed at the position of the upper end similarly to the case of the second greasing tube 52.

Also in the above embodiment, the back stop 40 includes the second greasing tube 52 for the elimination of abnormal noise generated in the contact part between the proximity of the opening portion 44 in the front end portion of the outer casing 41 and the outer circumference surface of the inner casing 42. However, since the proximity of the opening portion 44 in the front end portion of the outer casing 41 is at a position which enables greasing from the outside to be conducted with ease, the second greasing tube 52 may be omitted.

Further, the above embodiment has been described with respect to a case where the base end portion of the outer casing 41 of the back stop 40 is turnably connected to the boom 30, and the base end portion of the inner casing 42 of the back stop 40 is turnably connected to the crane main body 10. However, the present invention is not limited to the above case, but is also applicable to a case where the base end portion of the inner casing 42 of the back stop 40 is turnably connected to the boom 30, and the base end portion of the outer casing 41 of the back stop 40 is turnably connected to the crane main body 10. In this case, one end side of the coil spring 43 is fixed to the flange member 45 on the opening portion 44 side of the outer casing 41 (the front end portion side), and for example, a protrusion portion is provided on the outer circumference surface of the inner casing 42. Then, it is configured such that when the boom 30 is raised by more than a set angle, the other end side of the coil spring 43 hits the protrusion portion to stop.

Additionally, the present invention is not limited to the crawler crane 1 as in the above embodiment, but is widely applicable to a crane including a boom attached to a crane main body to be capable of going up and down, and a back stop with one end turnably connected to the boom and the other end turnably connected to the crane main body.

As described above, the back stop for a crane according to the present invention has the outer casing, the inner casing, and the inner greasing tube. The outer casing has the outer casing base end portion turnably connected to one of the up-down body and the crane main body, and the outer casing front end portion arranged on the side opposite to the outer casing base end portion, with the opening portion being opened in the outer casing front end portion. The inner casing has the inner casing base end portion turnably connected to the other of the crane main body and the up-down body, and the inner front end portion arranged on the side opposite to the inner casing base end portion and to be inserted into the outer casing from the opening portion, the inner casing being slidably fitted in the outer casing. The inner greasing tube is arranged inside one casing out of the outer casing and the inner casing and greases the slide portion between the outer circumference surface of the inner casing front end portion and the inner circumference surface of the outer casing. Also, the inner greasing tube has the inlet drawn out from the base end portion of the one casing to the outside of the one casing, the guide portion connected to the inlet and disposed in the one casing, and the discharge port connected to the guide portion and attached to the inner casing front end portion.

In this configuration, in a case where the back stop extends or contracts at the time of up-down work of the up-down body to cause abnormal noise at a part where the front end portion of the inner casing and the inner circumference surface of the outer casing of the back stop come into contact with each other, when an operator or a worker connects a grease gun or the like to the inlet of the inner greasing tube drawn out to the outside of the outer casing or the inner casing of the back stop to inject grease from the inlet of the inner greasing tube at an arbitrary up-down angle of the up-down body which requires greasing for eliminating the abnormal noise, the grease is discharged pin-point to the contact part between the front end portion of the inner casing and the inner circumference surface of the outer casing from the discharge port of the inner greasing tube attached to the front end portion of the inner casing through the guide portion of the inner greasing tube arranged in the outer casing or the inner casing of the back stop. This suppresses generation of abnormal noise in the front end portion of the inner casing to eliminate operator's discomfort and adverse effects on surrounding environment, as well as enabling greasing work to be conducted easily and quickly.

Here, it is preferable that the outer casing base end portion is turnably connected to the up-down body, the inner casing base end portion is turnably connected to the crane main body, the guide portion of the inner greasing tube is disposed in the inner casing, and the inlet is drawn out from the inner casing base end portion to the outside of the inner casing. The inner greasing tube is preferably disposed over the entire length of the inner casing.

In this case, the greasing tube is arranged in the inner casing having the base end portion thereof connected to the crane main body, the inlet of the greasing tube is drawn out from the base end portion of the inner casing to the outside of the inner casing, and the discharge port of the greasing tube is attached to the front end portion of the inner casing. Therefore, it is possible to conduct greasing work at a low position on the crane main body side safely and appropriately while reducing the length of the greasing tube as much as possible.

Additionally, it is preferable to further include a coil spring which is externally fitted to the outer circumference portion of the inner casing base end portion and comes into contact with the outer casing front end portion to compressively deform, in which the inner casing has an end plate fixed to the end edge of the inner casing base end portion, the end plate being formed with a hole portion opened which allows insertion of the guide portion such that the inlet of the inner greasing tube is arranged outside of the inner casing.

In this case, disposition of the inner greasing tube preventing the function of the coil spring is suppressed.

It is also preferable that the inner casing includes a contact member arranged in the inner casing front end portion and contacting the inner circumference surface of the outer casing, the contact member being provided with a through hole through which the guide portion is inserted such that the discharge port of the inner greasing tube is located closer to the front end portion side of the inner casing than the contact member is.

In this case, while making contact with the inner circumference surface of the outer casing, the contact member attached to the front end portion of the inner casing supplies grease to the contact part, the grease discharged from the discharge port of the inner greasing tube which penetrates through the through hole of the contact member to be attached to contact member, thereby reliably conducting greasing.

Further, a material of the contact member preferably has a coefficient of friction smaller than a coefficient of friction of a material of the inner casing.

In this case, a slide resistance between the contact member and the inner circumference surface of the outer casing becomes smaller than a slide resistance between the front end portion of the inner casing and the inner circumference surface of the outer casing, so that synergistic effects with greasing enables occurrence frequency of abnormal noise to be suppressed to be as low as possible.

Additionally, it is preferable that the back stop further includes an outer greasing tube arranged along the outer circumference portion of the outer casing to grease a slide portion between the inner circumference surface of the outer casing front end portion and the outer circumference surface of the inner casing, in which the outer casing front end portion is formed with a greasing port opened which penetrates the outer circumference surface of the outer casing and the inner circumference surface of the outer casing, and the outer greasing tube includes a discharge port connected to the greasing port of the outer casing front end portion so as to communicate with a gap between the inner circumference surface of the outer casing and the outer circumference surface of the inner casing.

In this configuration, in a case where the back stop extends or contracts at the time of up-down work of the up-down body to cause abnormal noise at a part where the proximity to the opening portion in the front end portion of the outer casing and the outer circumference surface of the inner casing of the back stop come into contact with each other, when an operator or a worker supplies grease through the outer greasing tube arranged along the entire length of the outer face of the outer casing at an arbitrary up-down angle of the up-down body which requires greasing for eliminating the abnormal noise, the grease is discharged from the discharge port of the outer greasing tube to the gap between the inner circumference surface of the outer casing and the outer circumference surface of the inner casing through the greasing port provided in the outer casing in proximity to the opening portion of the front end portion of the outer casing. Therefore, generation of abnormal noise near the opening portion of the front end portion of the outer casing can be suppressed to eliminate operator's discomfort and adverse effects on surrounding environment.

Also, the outer casing preferably includes a tubular member fixed to the inner circumference surface of the opening portion of the outer casing front end portion and having an inner circumference surface sliding with the outer circumference surface of the inner casing, and a material of the tubular member has a coefficient of friction smaller than a coefficient of friction of a material of the outer casing.

In this case, a slide resistance of the tubular member fitted in and fixed to the inner circumference surface near the opening portion in the front end portion of the outer casing with the outer circumference surface of the inner casing is smaller than a slide resistance of the inner circumference surface near the opening portion in the front end portion of the outer casing with the outer circumference surface of the inner casing, so that synergistic effects with greasing enables occurrence frequency of abnormal noise to be suppressed to be as low as possible.

The invention claimed is:

1. A back stop for a crane connected to an up-down body which is attached to a crane main body so as to be capable of going up and down and connected to the crane main body to prevent the up-down body from falling down, the back stop for a crane comprising:
    an outer casing which has an outer casing base end portion turnably connected to one of the up-down body and the crane main body, and an outer casing front end portion arranged on a side opposite to the outer easing base end portion, and is formed with an opening portion opened in the outer casing front end portion;
    an inner casing which has an inner casing base end portion turnably connected to the other of the crane main body and the up-down body, and an inner front end portion arranged on a side opposite to the inner casing base end portion and to be inserted into the outer casing from the opening portion, and is slidably fitted in the outer casing; and
    an inner greasing tube which is arranged inside one casing out of the outer casing and the inner casing and greases a slide portion between an outer circumference surface of the inner casing front end portion and an inner circumference surface of the outer casing,
    wherein the inner greasing tube includes:
        an injection portion which is arranged, on a base end portion side out of an outer casing base end portion side or an inner casing base end portion side of the one casing, outside of the one casing, and is formed with an inlet opened for accepting grease;
        a guide portion connected to the injection portion and disposed in the one casing; and
        a discharge portion connected to the guide portion and attached to the inner casing front end portion, and is formed with a discharge port opened to allow the grease having passed through the guide portion to be discharged into the outer casing.

2. The back stop for a crane according to claim 1, wherein the outer casing base end portion is turnably connected to the up-down body,
    the inner casing base end portion is turnably connected to the crane main body, and
    the guide portion of the inner greasing tube is disposed in the inner casing and the injection portion is arranged outside of the inner casing on the inner casing base end portion side.

3. The back stop for a crane according to claim 2, wherein the inner greasing tube is disposed over an entire length of the inner casing.

4. The back stop for a crane according to claim 2, further comprising a coil spring which is externally fitted to an outer circumference portion of the inner casing base end portion and comes into contact with the outer casing front end portion to compressively deform,
    wherein the inner casing has an end plate which covers an end portion of the inner casing base end portion, the end plate being formed with a hole portion opened which allows insertion of the guide portion such that the injection portion of the inner greasing tube is arranged outside of the inner casing.

5. The back stop for a crane according to claim 2, wherein the inner casing includes a contact member which forms at least a part of the inner casing front end portion and contacts the inner circumference surface of the outer casing, the contact member being provided with a through hole through which insertion of the guide portion is allowed such that the discharge portion of the inner greasing tube is located closer to the front end portion side of the inner casing than the contact member is.

6. The back stop for a crane according to claim 5, wherein a material of the contact member has a coefficient of friction smaller than a coefficient of friction of a material of the inner casing.

7. The back stop for a crane according to claim 1, wherein the back stop further includes an outer greasing tube arranged along an outer circumference portion of the outer casing to grease a slide portion between an inner circumference surface of the outer casing front end portion and an outer circumference surface of the inner casing, the outer casing front end portion is formed with a greasing port opened which penetrates the outer casing front end portion so as to communicate the outer circumference surface of the outer casing with the inner circumference surface of the outer casing, and the outer greasing tube includes an outer discharge portion connected to the greasing port of the outer casing front end portion so as to communicate with a gap between the inner circumference surface of the outer casing and the outer circumference surface of the inner casing.

8. The back stop for a crane according to claim 7, wherein the outer casing includes a tubular member fixed to an inner circumference surface of the opening portion of the outer casing front end portion and having a slide inner circumference surface slidable with the outer circumference surface of the inner casing, and a material of the tubular member has a coefficient of friction smaller than a coefficient of friction of a material of the outer casing.

* * * * *